United States Patent
Yun et al.

(10) Patent No.: US 7,825,184 B2
(45) Date of Patent: Nov. 2, 2010

(54) SHEET COMPOSITION OF THERMOPLASTIC POLYOLEFIN ELASTOMER FOR WATER BASED COATING TREATMENT

(75) Inventors: Mi Jung Yun, Gyeonggi-do (KR); Ki Eyoun Jeong, Gyeonggi-do (KR); In Soo Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 540 days.

(21) Appl. No.: 11/982,538

(22) Filed: Nov. 1, 2007

(65) Prior Publication Data

US 2008/0249223 A1 Oct. 9, 2008

(30) Foreign Application Priority Data

Apr. 4, 2007 (KR) ...................... 10-2007-0033460

(51) Int. Cl.
*C08L 23/00* (2006.01)
(52) U.S. Cl. ........................ 524/528; 524/394; 524/425; 524/433; 524/449; 524/451; 524/515; 524/525; 525/240
(58) Field of Classification Search ................. 524/515, 524/525, 528; 525/240
See application file for complete search history.

(56) References Cited

U.S. PATENT DOCUMENTS 6,162,872 A * 12/2000 Berta .......................... 525/240
6,218,474 B1 4/2001 Valligny et al.

FOREIGN PATENT DOCUMENTS

| JP | 05-004307 | 1/1993 |
| KR | 100199282 | 3/1999 |
| KR | 1020030092575 | 12/2003 |
| KR | 1020040018231 | 3/2004 |
| KR | 1020040104951 | 12/2004 |
| KR | 2005123255 A * | 12/2005 |

* cited by examiner

*Primary Examiner*—Vickey Nerangis
(74) *Attorney, Agent, or Firm*—Edwards Angell Palmer & Dodge LLP; Peter F. Corless

(57) ABSTRACT

The present invention relates to a thermoelastic polyolefin-based elastomer sheet composition for water based coating treatment, which comprises a partially crosslinked thermoelastic polyolefin-based elastomer resin, a non-crosslinked thermoelastic polyolefin-based elastomer resin, a polypropylene resin, an ethylene octene rubber resin, a linear low density polyethylene resin, polyethylene master batch containing a lubricant, and an inorganic filler, the composition being useful for vehicular inner parts (e.g., crash pad) due to its superior elongation, heat resistance, humidity resistance and molding property.

7 Claims, No Drawings

SHEET COMPOSITION OF THERMOPLASTIC POLYOLEFIN ELASTOMER FOR WATER BASED COATING TREATMENT

CROSS-REFERENCE TO RELATED APPLICATION

This application claims, under 35 U.S.C. §119(a), the benefit of Korean Patent Application No. 10-2007-0033460 filed on Apr. 4, 2007, the entire disclosure of which is hereby incorporated by reference.

BACKGROUND (a) Technical Field

The present invention relates to a thermoelastic polyolefin-based elastomer sheet composition for water based coating treatment. More particularly, it relates to a thermoelastic polyolefin-based elastomer sheet composition for water based coating treatment that exhibits improved elongation, heat resistance, light resistance, humidity resistance and molding property so as to be used for coating or surface treating vehicular inner parts, e.g., crash pad.

(b) Background Art

Alloy extrusion sheet or calendering sheet prepared using vinyl chloride or vinyl chloride/acrylonitrile butadiene styrene elastomer was used as a surface material of various inner parts of a vehicle, including, e.g., instrument panel, door trim panel and headlining. Such sheets have been replaced with thermoelastic polyolefin-based elastomer sheet, which is eco-friendly, light, and resistant to fogging and odors.

Vehicular inner parts can be coated or surface treated for improving physical properties (e.g., friction resistance and abrasion resistance), chemical properties (e.g., resistance to chemicals and solvents) and light resistance. Such coating or surface treatment also can lower gloss to secure the vision of a driver and make the surface color in harmony with surrounding parts.

Thermoelastic polyolefin-based elastomer sheet has a non-polar and high crystalline structure, and its adhesion property is poor. Thus, it requires surface treatment using, for example, flame, ozone, plasma, or chlorinated polyolefin resin-based primer, followed by treatment with acrylated resin-based base coating material and urethane resin-based clear coating material.

Many attempts have been made to provide a composition comprising thermoelastic polyolefin-based elastomer. Korean patent No. 10-0506754, for example, discloses a composition comprising a highly crosslinked polypropylene resin, a partially crosslinked polypropylene-based resin, a reactive propylene-based resin, a highly crosslinked thermoelastic olefin resin, a homopropylene resin, a branched polypropylene resin, a linear low density polyethylene resin, a UV stabilizer, a lubricant and a pigment.

Also, Korean patent No. 10-0547657 discloses a composition comprising a polyolefin-based thermoelastic resin, an ethylene-propylene-diene rubber, an ethylene-octene copolymer and a resin crosslinker.

These compositions, however, have disadvantages. They show low adhesion with aqueous coating material. They also have low elongation.

Therefore, there exists a need for developing an elastomer sheet composition that can overcome the above-described problems associated with prior art.

The above information disclosed in this Background section is only for enhancement of understanding of the background of the invention and therefore it may contain information that does not form the prior art that is already known in this country to a person of ordinary skill in the art.

SUMMARY OF THE INVENTION

In one aspect, the present invention provides an elastomer sheet composition, which comprises partially crosslinked thermoelastic polyolefin-based elastomer resin, non-crosslinked thermoelastic polyolefin-based elastomer resin, polypropylene resin, ethylene octene rubber resin, linear low density polyethylene resin, polyethylene master batch containing a lubricant, and an inorganic filler.

In another aspect, the present invention provides a thermoelastic polyolefin-based elastomer sheet composition for water based coating treatment, which comprises: (a) 40-45 wt % of a partially crosslinked thermoelastic polyolefin-based elastomer resin; (b) 5-10 wt % of a non-crosslinked thermoelastic polyolefin-based elastomer resin; (c) 15-20 wt % of a polypropylene resin; (d) 15-20 wt % of an ethylene octene rubber resin; (e) 2-5 wt % of a linear low density polyethylene resin having specific gravity of 0.92-0.94; (f) 10-15 wt % of a polyethylene master batch comprising 2-3 wt % of a lubricant; and (g) 4-5 wt % of an inorganic filler.

In a preferred embodiment, the partially crosslinked thermoelastic polyolefin-based elastomer resin has degree of crosslinking of 70-80%, hardness of 63-67 A and melting index of 0.6-1.2 g/10 minutes (230° C., 5 kg).

In another preferred embodiment, the non-crosslinked thermoelastic polyolefin-based elastomer resin has hardness of 88-92 A, melting index of 0.8-1.2 g/10 minutes (230° C., 2.16 kg) and density of 0.88-0.90.

In still another preferred embodiment, the polypropylene resin has hardness of 90-97 A, melting index of 1.5-2.5 g/10 minutes (230° C., 2.16 kg) and density of 0.90-0.92.

In a further preferred embodiment, the ethylene octene rubber resin has hardness of 63-67 A and melting index of 0.4-0.7 (190° C., 2.16 kg).

In a still further preferred embodiment, the lubricant can be selected from the group consisting of calcium stearate, silica powders and a mixture thereof.

In yet a further preferred embodiment, the inorganic filler can be selected from the group consisting of calcium carbonate, calcium oxide, mica, talc and a mixture thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present compositions will be particularly useful with a wide variety of motor vehicles.

Other aspects of the invention are discussed infra.

DETAILED DESCRIPTION

As discussed above, one aspect of the present invention provides a thermoelastic polyolefin-based elastomer sheet composition for water based coating treatment comprising: a partially crosslinked thermoelastic polyolefin-based elastomer resin, a non-crosslinked thermoelastic polyolefin-based elastomer resin, a polypropylene resin, an ethylene octene rubber resin, a linear low density polyethylene resin, a polyethylene master batch containing a lubricant, and an inorganic filler.

A partially crosslinked thermoelastic polyolefin-based elastomer resin contributes to enhance the melt strength of the composition, which is an essential property in calendering process, and secure an appropriate deflection during vacuum molding. The partially crosslinked thermoelastic polyolefin-based elastomer resin has a structure where polypropylene chains pass through the partially crosslinked rubber, and uniformly extends during the elongation, thus minimizing the thickness deviation. Preferably, the partially crosslinked thermoelastic polyolefin-based elastomer resin has the degree of crosslinking of 70-80%, the hardness of 63-67 A and the melting index of 0.6-1.2 g/10 minutes (230° C., 5 kg). When the degree of crosslinking is less than 70%, it is difficult to conduct calendering process due to the decrease in the melt strength. When the degree of crosslinking is higher than 80%, the elongation may be lowered. When the hardness is less than 63 A, the resin easily extends and vacuum molding property may be lowered. When the hardness is higher than 67 A, the feel of the resin may be deteriorated. When the melting index is less than 0.6 g/10 minutes (230° C., 5 kg), the dispersion property may be lowered during the calendering process and this may generate surface binding. When the melting index is higher than 1.2 g/10 minutes (230° C., 5 kg), the resin may adhere to a calendering roll. When the density is out of the aforementioned range, the resin may not be suitable to be used for vehicles.

A preferable amount of the partially crosslinked thermoelastic polyolefin-based elastomer resin is 40-45 wt %. When the amount is less than 40 wt %, the hardness may increase and the molding property may decrease. When the amount is higher than 45 wt %, the hardness may decrease and the calendering processability may be lowered.

The present compositions also include a non-crosslinked thermoelastic polyolefin-based elastomer resin. The melt strength of the non-crosslinked thermoelastic polyolefin-based elastomer resin is lower than that of the crosslinked thermoelastic polyolefin-based elastomer resin, but it is higher than that of the typical olefin-based resin. In a preferred embodiment, the non-crosslinked thermoelastic polyolefin-based elastomer resin has the hardness of 88-92 A, the melting index of 0.6-1.2 g/10 minutes (230° C., 2.16 kg) and the density of 0.88-0.90. When the hardness is out of the aforementioned range, the softness of the product may be lowered. When the melting index is less than 0.6 g/10 minutes (230° C., 2.16 kg), the dispersion property may be lowered during the calendering process and this may generate the surface binding. When the melting index is higher than 1.2 g/10 minutes (230° C., 2.16 kg), the resin may adhere to the calendering roll. When the density is out of the aforementioned range, the resin may not meet the vehicle requirements. A preferable resin has a typical elongation (600-700%) of thermoelastic polyolefin-based elastomer in a wide use. A suitable amount of the thermoelastic polyolefin-based elastomer resin is 5-10 wt %. When the amount is less than 5 wt %, odor of product may be generated. When the amount is higher than 10 wt %, the resin may early be deflected during the vacuum molding process.

A polypropylene resin is included in the present compositions. The polypropylene resin contributes to increase the shape maintenance of thermoelastic resin after molding process and decrease the change the embossing during vacuum molding process.

The polypropylene resin herein is, preferably, a homopolymer, which emits little odor and shows little change due to temperature or light. According to a preferred embodiment, the polypropylene resin has hardness of 90-97 A, melting index of 1.5-2.5 g/10 minutes (230° C., 2.16 kg) and density of 0.90-0.92. When the hardness is less than 90 A, embossing may change drastically. When the hardness is higher than 97 A, the product may become too rigid. When the melting index is less than 1.5 g/10 minutes (230° C., 2.16 kg), the calendering fluidity may be lowered. When the melting index is higher than 2.5 g/10 minutes (230° C., 2.16 kg), there may be problems of roll adhesion during the calendering process or difficulty in winding process. When the density is out of the aforementioned range, the resin may not meet the vehicle requirements.

A preferable amount of the polypropylene resin is 15-20 wt %. If the amount is less than 15 wt %, the shape maintenance of the thermoelastic polyolefin sheet after the molding process may be deteriorated. When the amount is higher than 20 wt %, calendering process may not be conducted due to drastic decrease in melt strength, and deflection may be increased.

High melt strength can be obtained, at least in part, due to presence of linear low density polyethylene resin (as detailed below) and polypropylene resin, thereby enabling a calendering process.

The present compositions also include an ethylene octene rubber resin. The ethylene octene rubber resin is used to resolve the drawbacks associated with crosslinking, i.e. odors and change in properties. When used in combination with fillers described below, the ethylene octene rubber resin impregnates into the fillers, thus providing similar level of strength to that of crosslinked thermoelastic polyolefin-based elastomer resin and improving odor-related problems. Preferably, the ethylene octene rubber has hardness of 63-67 A and melting index of 0.4-0.7 g/10 minutes (190° C., 2.16 kg). When the hardness is less than 63 A, deflection may increase during the vacuum molding process. When the hardness is higher than 67 A, the product may not meet the vehicle requirements. When the melting index is less than 0.4 g/10 minutes (190° C., 2.16 kg), fluidity may be lowered during the calendering process. When the melting index is higher than 0.7 g/10 minutes (190° C., 2.16 kg), the resin may adhere to the calendering roll. A preferable amount of the ethylene octene rubber resin is 15-20 wt %. When the amount is less than 15 wt %, the hardness of the product may increase and the odor problem may not be solved. When the amount is higher than 20 wt %, deflection may increase during the vacuum molding process.

Hereunder is provided a description of the linear low density polyethylene resin used in the present invention. Generally, the polyethylene resin may be divided into high density, middle density and low density polyethylene resins. Among them, the low density polyethylene resin is known to be soft and superior in molding property. Among them, linear low density polyethylene (LLDPE) has non-uniform molecular size as compared to normal low density polyethylene resin, and is similar to high density polyethylene in molecular structure. LLDPE has also relatively high melt viscosity, and is superior in scratch resistance, tear resistance and surface hardness, thus increasing the quality of a molded product.

As compared to normal low density polyethylene, linear low density polyethylene resin is superior in tensile strength, elongation and rigidity. Linear low density polyethylene resin also shows narrower molecular weight distribution, and has only short side chains as compared to normal low density polyethylene resin. This has higher crystallinity and melting point than normal low density polyethylene although this has wide distribution of short side chain and uniform branch degree of side chains, thus being advantageous in wide temperature range in pre-heating during the molding process. A preferable amount of the linear low density polyethylene resin is 2-5 wt %. When the amount is less than 2 wt %, the fluidity may be lowered during the calendering process. When the amount is higher than 5 wt %, the hardness of product may be increased.

In addition, a polyethylene master batch containing a lubricant is included in the present compositions. It is used for improving dispersion property and working environment and preventing surface adhesion and increasing elongation, humidity resistance and molding property. A preferable polyethylene master batch contains 2-3 wt % of a lubricant. When the content of the lubricant is less than 2 wt %, the whitening of surface may be caused. When the content is higher than 3 wt %, the mixing stability with the thermoelastic polyolefin resin composition may be deteriorated. Non-limiting examples of the lubricant include calcium stearate, silica powders and a mixture thereof.

Generally, thermoelastic polyolefin-based elastomers may cause adhesion during the calendering process due to lower melt strength than PVE and the absence of liquid component, thus necessitating the use of a lubricant. Because an organic lubricant lowers the printing property despite its high activity, powder type of calcium stearate, silica or a mixture thereof is used in the present invention. Polyethylene and lubricant are preferably used in the form of a master batch because powders of a lubricant may not be well mixed with thermoelastic polyolefin-based resin and may be scattered during the mixing process, thus deteriorating the working conditions. According to a preferred embodiment, the polyethylene master batch containing 2-3 wt % of a lubricant is used in the amount of 10-15 wt %. When the amount is less than 10 wt %, the heat resistance and the calendering molding property may be lowered. When the amount is higher than 15 wt %, whitening may be observed in the surface due to excessive use of a lubricant.

Also, an inorganic filler is included in the present compositions. It contributes to improve the mechanical properties of the composition. Non-limiting examples of the inorganic filler include calcium carbonate, calcium oxide, mica, talc and a mixture thereof. The inorganic filler is preferably used in an amount of 4-5 wt %. When the amount is less than 4 wt %, the filler may bind with the ethylene octene rubber resin, thus deteriorating properties, and adhesion may also be generated on the roll during calendering process. When the amount is higher than 5 wt %, the molded product may burst due to the increase in hardness and the decrease in elongation.

It is to be understood by those skilled in the art that thermoelastic polyolefin-based elastomer sheet compositions according to preferred embodiments of the present invention can be prepared by conventional methods known in the art. For example, the compositions can be prepared by mixing the components and melting in a test roll at 190-200° C. for 9-11 minutes to provide a sheet-shaped composition with a thickness of 0.4-0.5 mm.

EXAMPLES

The present invention is described in more detail by the following Examples. Examples, however, are meant only to illustrate the present invention. They should not be construed as limiting the scope of the claimed invention.

Preparation of Compositions

Examples 1-2 and Comparative Examples 1-5

Compositions are prepared as set forth in Table 1, and the properties of the compositions are provided in Table 3.

TABLE 1

| Component (wt %) | A | A-1 | B | C | D | E | F | G |
|---|---|---|---|---|---|---|---|---|
| Ex. 1 | 42 | — | 5 | 15 | 20 | 3 | 11 | 4 |
| Ex. 2 | 40 | — | 6 | 17 | 17 | 5 | 10 | 5 |
| Comp. Ex. 1 | 35 | — | 10 | 20 | 15 | 15 | — | 5 |
| Comp. Ex. 2 | 47 | — | 10 | 10 | 18 | 12 | — | 3 |
| Comp. Ex. 3 | — | 45 | 5 | 15 | 20 | — | 11 | 4 |
| Comp. Ex. 4 | 42 | — | 5 | 15 | 20 | 3 | 11 | 4 |
| Comp. Ex. 5 | 20 | 25 | 5 | 15 | 20 | — | 11 | 4 |

The component A is a partially crosslinked thermoelastic polypropylene elastomer resin having hardness of 65 A, melting index of 0.8 (230° C., 5 kg) and density of 0.88. The component A-1 is a partially crosslinked thermoelastic polypropylene elastomer resin having hardness of 65 A, melting index of 0.4 (230° C., 5 kg) and density of 0.88. The component B is a non-crosslinked thermoelastic polypropylene elastomer resin having hardness of 90 A, melting index of 0.8 (230° C., 2.16 kg), density 0.90 and expansion coefficient of 684%. The component C is a polypropylene resin having hardness of 95 A, melting index of 1.7 (230° C., 2.16 kg), density of 0.90 and expansion coefficient of 25%. The component D is an ethylene octene rubber having hardness of 65 A, melting index of 0.5 (190° C., 2.16 kg) and density of 0.89. The component E is a polyethylene (density of 0.92). The component F is a polyethylene master batch with polyethylene content of 80 wt %, calcium stearate content of 10 wt % and silica content of 10 wt %. The component G is an inorganic filler ($CaCO_3$).

Properties of the Compositions
1. Tensile Strength and Elongation

Maximum load and elongation of constant area were measured using a tensile tester and a type 1 specimen at a test rate of 200 mm/minute at the distance of 70 mm between marks according to ASTM D 638.

2. Tear Strength

Specimen was torn at a rate of strain of 200 mm/minute using a dumbbell B-type specimen and a tensile test according to KS M6518, and load was obtained by averaging the maximum values.

3. Heat Aging Resistance

Specimen was stored for 300 hours in an oven, which is maintained at 110±2° C. and with the forced convection, and $\Delta E_{cmc}$ was measured at the angle of 45° using a spectrophotometer. The discoloration was observed with naked eye, and assessed according to the gray scale described in ISO 105-A02.

4. Light Aging Resistance

Specimen was irradiated at the power of 126 MJ/m² using a tester described according to ISO 105 at a black panel temperature of 89±3° C. and internal humidity of a tester of 50±5% RH. The discoloration was observed with naked eye, and assessed according to the gray scale described in ISO 105-A02.

5. Humidity Resistance

Specimen was stored for 168 hours in saturated steam at the temperature of 50±2° C. and the humidity of 98±2% RH. After the specimen was placed at room temperature for 1 hour, its appearance was observed.

6. Chemical Resistance

The surface of specimen was polished 10 times with a gauze wet with the test liquids described in Table 2, and was placed at room temperature for 1 hour. The discoloration was observed with naked eye, and evaluated according to the gray scale described in ISO 105-A02.

TABLE 2

| Test liquids | Description |
|---|---|
| Glass cleaner | Weak alkaline glass cleaner |
| Cleaner | Mixture of 95% distilled water and 5% neutral detergent |
| Wind shield washer fluid | Mixture of 50% isopropyl alcohol and 50% distilled water |
| Gasoline | Unleaded gasoline |
| Polishing wax | Transparent polishing wax |

7. Sun-cream Resistance

According to GMN 10033, two sheets of white cotton tissue was piled one overlapped with another on aluminum plate (50 mm×50 mm), and 0.25 g of sun cream (Coppertone Waterbabies SPF 45) was coated on the front surface. This was placed on specimen, and the aluminum plate was loaded (500 g). This was placed in a constant-temperature vessel (80±2° C.) for 1 hour, and the white cotton tissue and the acrylate plate were removed. The specimen was placed at room temperature for 10-15 minutes, and washed with a neutral detergent. After drying the specimen, discoloration was evaluated with naked eye.

8. Odor

A glass bottle (4 L) was placed at 100° C. for 1 hour, and cooled at room temperature for 1 hour, thus evaporating odors in the glass bottle. The glass bottle containing specimen (50 mm×60 mm) was stored at 100° C. for 2 hours, and cooled at room temperature (23±2° C.) for 1 hour. The bottle was 3-4 cm uncapped, odor was evaluated according to the odor standard.

9. Large-Scale Molding Property and Product Appearance

Vacuum-molded thermoelastic elastomer sheet was introduced into a mass-production line of crash pad. Molding properties and appearance of final products and problems during the process were evaluated in the presence of a person in charge of quality. The gloss change was evaluated with naked eye.

TABLE 3

| Properties | Examples | | Comparative Examples | | | | |
|---|---|---|---|---|---|---|---|
|  | 1 | 2 | 1 | 2 | 3 | 4 | 5 |
| Tensile strength | 114 | 107 | 111 | 102 | 97 | Immoldable | 124 |
| Tear strength | 6.6 | 6.2 | 5.7 | 5.8 | 5.2 | Immoldable | 537 |
| Elongation | 542 | 537 | 545 | 520 | 515 | Immoldable | 532 |
| Heat aging resistance | 4 | 4 | 3 | 3 | 4 | Immoldable | 4 |
| Light aging resistance | 3 | 3 | 2 | 2 | 3 | Immoldable | 3 |
| Humidity resistance | Good | Good | Whitening | Whitening | Good | Immoldable | Good |
| Chemical resistance | 5 | 5 | 3 | 3 | 5 | Immoldable | 5 |
| Sun-cream resistance | Good | Good | Good | Good | Good | Immoldable | 5 |
| Odor | 3 | 3 | 3 | 3 | 3 | Immoldable | 3 |
| Large-scale moldability | Good | Good | Good | Good | Bad | Immoldable | Bad |
| Product appearance | Good | Good | Staining | Staining | Bad | Immoldable | Bad |

As shown in Table 3, the resin composition prepared in Examples 1-2 show better humidity resistance, chemical resistance and product appearance than those prepared in Comparative Examples 1-5, along with improvements in light aging resistance and heat resistance.

As described above, the thermoelastic polyolefin-based elastomer sheet composition for water based coating treatment herein show superior humidity resistance, chemical resistance, product appearance, light aging resistance and heat resistance, thus being used as an aqueous coating material for a crash pad base of a vehicle.

What is claimed is:

1. A thermoelastic polyolefin-based elastomer sheet composition for water based coating treatment, which comprises:
    (a) 40-45 wt % of a partially crosslinked thermoelastic polyolefin-based elastomer resin;
    (b) 5-10 wt % of a non-crosslinked thermoelastic polyolefin-based elastomer resin;
    (c) (c) 15-20 wt % of a polypropylene resin;
    (d) 15-20 wt % of an ethylene octene rubber resin;
    (e) 2-5 wt % of a linear low density polyethylene resin having specific gravity of 0.92-0.94;
    (f) 10-15 wt % of a polyethylene master batch comprising 2-3 wt % of a lubricant; and
    (g) 4-5 wt % of an inorganic filler.

2. The thermoelastic polyolefin-based elastomer sheet composition of claim 1, wherein the partially crosslinked thermoelastic polyolefin-based elastomer resin has degree of crosslinking of 70-80%, hardness of 63-67 A and melting index of 0.6-1.2 g/10 minutes (230° C., 5 kg).

3. The thermoelastic polyolefin-based elastomer sheet composition of claim 1, wherein the non-crosslinked thermoelastic polyolefin-based elastomer resin has hardness of 88-92 A, melting index of 0.8-1.2 g/10 minutes (230° C., 2.16 kg) and density of 0.88-0.90.

4. The thermoelastic polyolefin-based elastomer sheet composition of claim 1, wherein the polypropylene resin has hardness of 90-97 A, melting index of 1.5-2.5 g/10 minutes (230° C., 2.16 kg) and density of 0.90-0.92.

5. The thermoelastic polyolefin-based elastomer sheet composition of claim 1, wherein the ethylene octene rubber resin has hardness of 63-67 A and melting index of 0.4-0.7 (190° C., 2.16 kg).

6. The thermoelastic polyolefin-based elastomer sheet composition of claim 1, wherein the lubricant is selected from the group consisting of calcium stearate, silica powders and a mixture thereof.

7. The thermoelastic polyolefin-based elastomer sheet composition of claim 1, wherein the inorganic filler is selected from the group consisting of calcium carbonate, calcium oxide, mica, talc and a mixture thereof.

* * * * *